United States Patent
Mason

(10) Patent No.: US 8,740,254 B2
(45) Date of Patent: Jun. 3, 2014

(54) APPARATUS AND METHOD FOR PROTECTING STORZ FIRE FIGHTING HOSE COUPLINGS

(75) Inventor: Thomas E. Mason, Washington, IN (US)

(73) Assignee: Tyco Fire + Security GmbH (CH)

( * ) Notice: Subject to any disclaimer, the term of this patent is extended or adjusted under 35 U.S.C. 154(b) by 346 days.

(21) Appl. No.: 13/261,021

(22) PCT Filed: May 18, 2010

(86) PCT No.: PCT/US2010/001470
§ 371 (c)(1),
(2), (4) Date: Nov. 17, 2011

(87) PCT Pub. No.: WO2010/134979
PCT Pub. Date: Nov. 25, 2010

(65) Prior Publication Data
US 2012/0061952 A1    Mar. 15, 2012

Related U.S. Application Data

(60) Provisional application No. 61/216,916, filed on May 22, 2009.

(51) Int. Cl.
*F16L 11/12* (2006.01)
(52) U.S. Cl.
USPC ............. 285/45; 285/73; 285/376; 239/288.3
(58) Field of Classification Search
USPC ............ 285/45, 73, 70, 79, 87, 376; 138/110, 138/100; 239/288, 288.3, 288.5; 403/11, 12
See application file for complete search history.

(56) References Cited

U.S. PATENT DOCUMENTS

| | | | |
|---|---|---|---|
| 489,107 A | 1/1893 | Storz | |
| 1,810,948 A | 6/1931 | Dom | |
| 1,934,681 A | 11/1933 | Damsel | |
| 2,482,962 A * | 9/1949 | Boice | 285/16 |
| 3,052,488 A * | 9/1962 | Bruning | 285/18 |
| 4,139,224 A | 2/1979 | Leach | |
| 4,213,868 A | 7/1980 | Bitely, Jr. et al. | |
| 4,269,226 A * | 5/1981 | Allread | 137/614 |
| 4,270,701 A | 6/1981 | Hechler, IV | |
| 4,524,997 A | 6/1985 | Ebert | |
| 4,741,559 A * | 5/1988 | Berghman | 285/45 |
| 4,792,162 A | 12/1988 | Medvick | |
| 5,301,985 A | 4/1994 | Terzini | |
| 5,333,915 A | 8/1994 | Sparling | |
| 5,527,071 A | 6/1996 | Briggs | |

(Continued)

FOREIGN PATENT DOCUMENTS

JP    2004003553 A  *  1/2004

OTHER PUBLICATIONS

Storz, Wikipedia article, retrieved from: http://en.wikipedia.org/wiki/Storz, dated Jan. 3, 2009.

*Primary Examiner* — James Hewitt
*Assistant Examiner* — Jay R Ripley
(74) *Attorney, Agent, or Firm* — Sue Z. Shaper

(57) ABSTRACT

An apparatus and method for protecting Storz fire fighting fittings from damage associated with being dropped, or dragged, or from colliding with other equipment or the like during deployment and operation, and including a bumper.

13 Claims, 14 Drawing Sheets

(56) References Cited

U.S. PATENT DOCUMENTS

| | | |
|---|---|---|
| 5,791,723 A | 8/1998 | Bell |
| 5,863,079 A * | 1/1999 | Donais et al. .................. 285/45 |
| 5,927,760 A | 7/1999 | Rocha |
| 6,102,450 A | 8/2000 | Harcourt |
| 6,928,944 B2 | 8/2005 | Stoll |
| 7,128,091 B2 | 10/2006 | Istre |
| 7,572,981 B2 * | 8/2009 | Koizumi et al. .............. 174/111 |
| 7,798,535 B2 * | 9/2010 | Calhoun ...................... 285/373 |
| 2004/0201215 A1 | 10/2004 | Steingass |

* cited by examiner

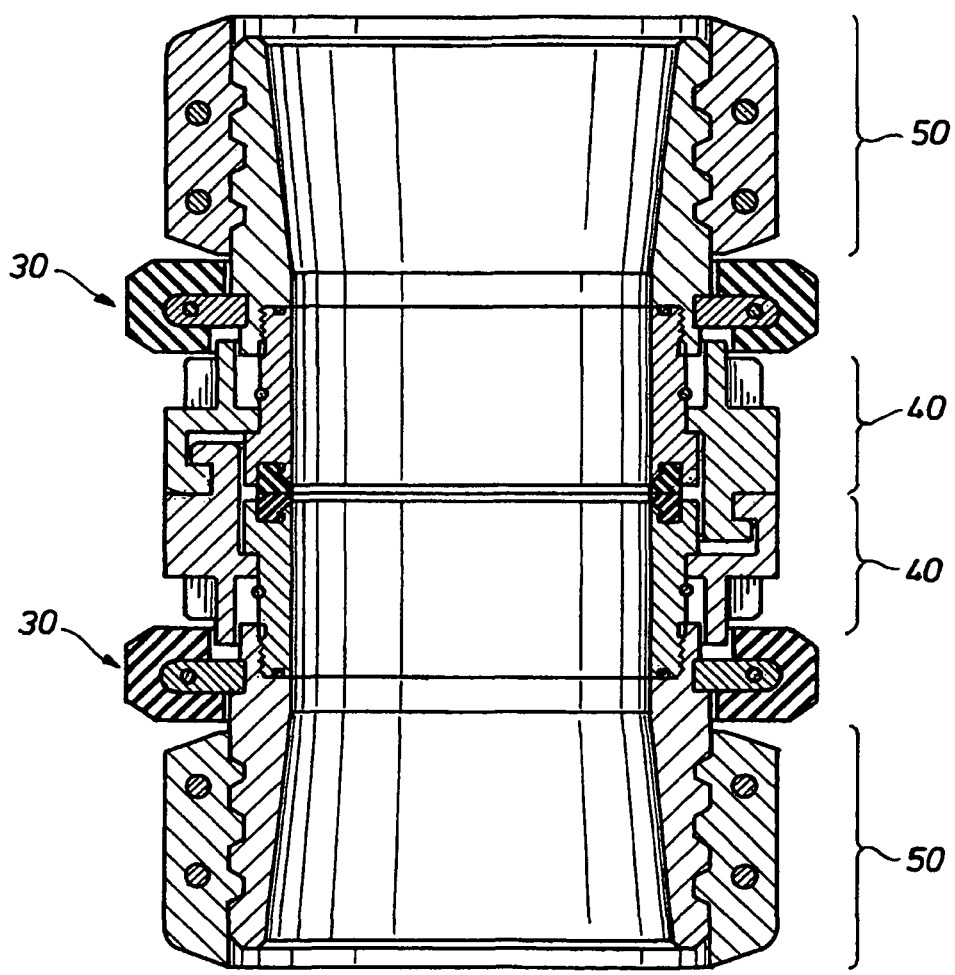

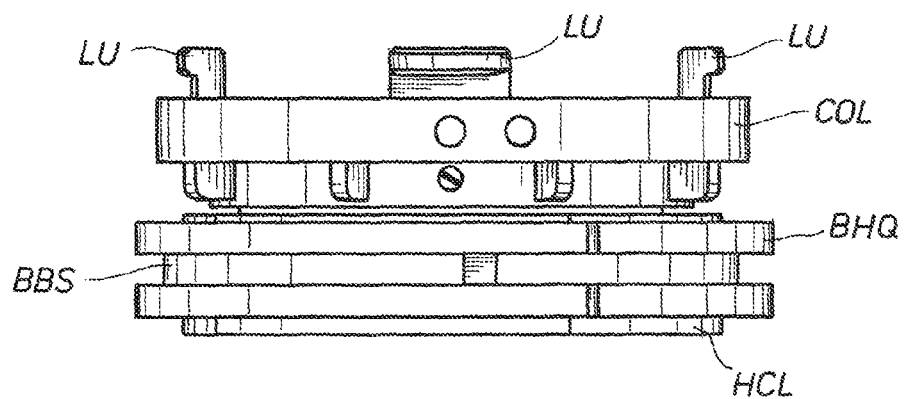
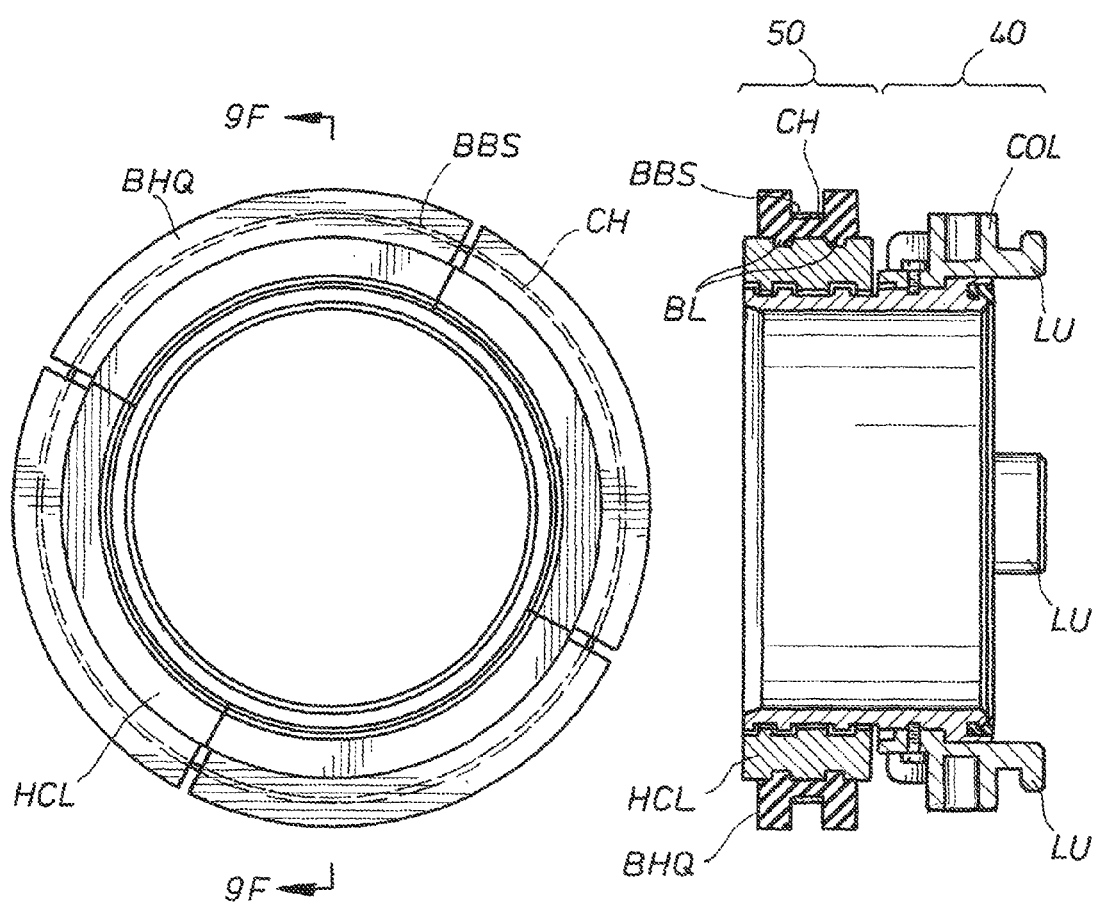
FIG.9D
FIG.9E
FIG.9F

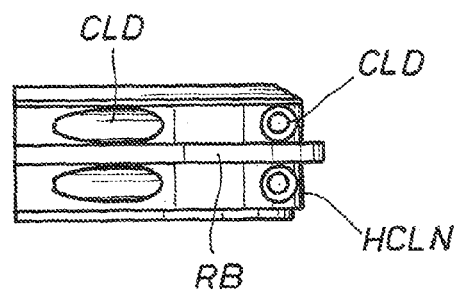
FIG.15A
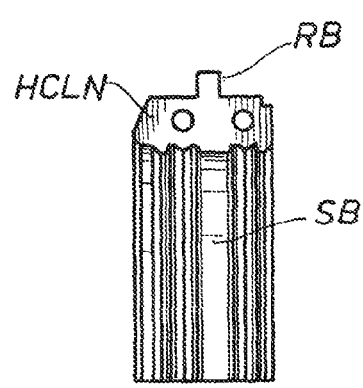
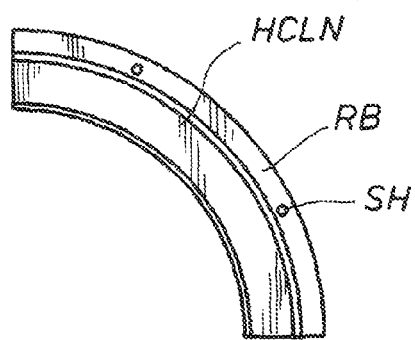
FIG.15B
FIG.15C
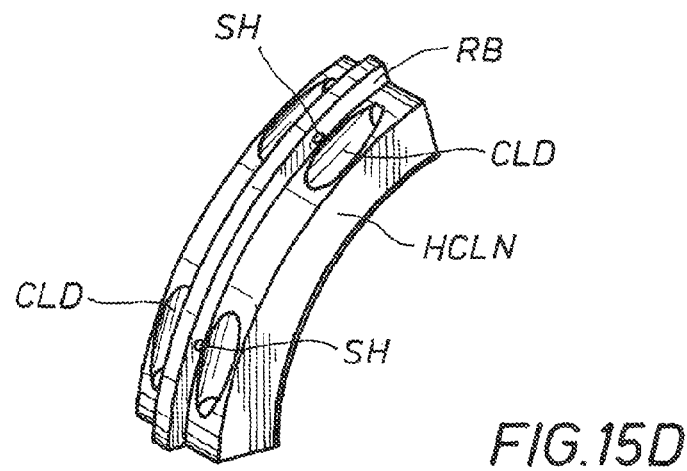
FIG.15D

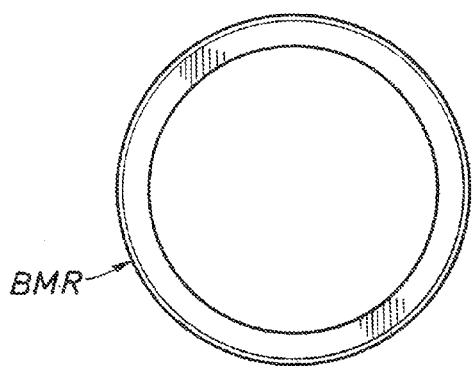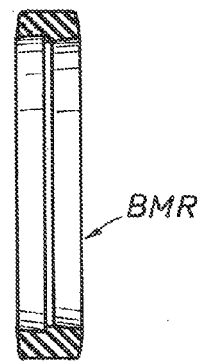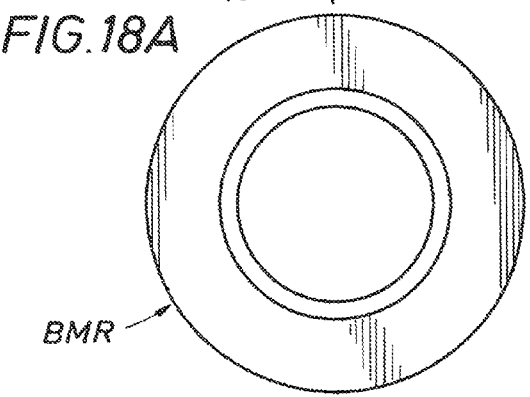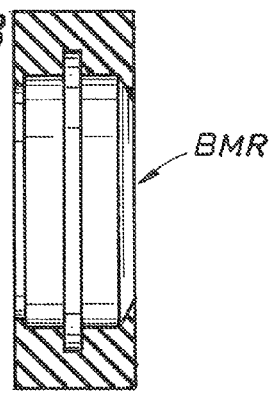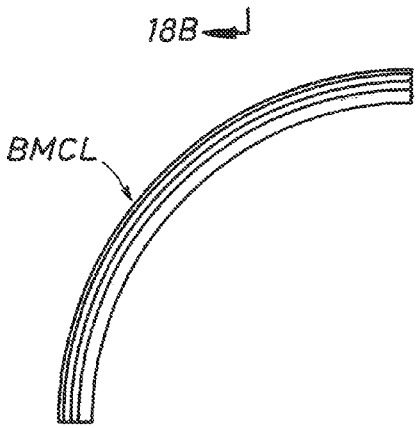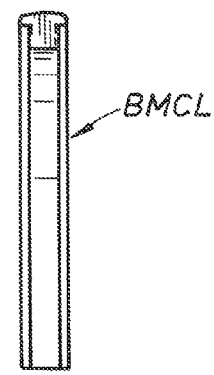

APPARATUS AND METHOD FOR PROTECTING STORZ FIRE FIGHTING HOSE COUPLINGS

This invention claims priority to my provisional application, Ser. No. 61/216,916, filed May 22, 2009, entitled Apparatus and Method for Protecting Storz Hose-type Fire Fighting Fitting, inventor Tom E. Mason, the contents of which are hereby incorporated herein by reference in their entirety.

FIELD OF THE INVENTION

The field of the invention lies in methods and apparatus for protecting Storz fire fighting hose couplings from damage associated with being dropped or dragged, or from colliding with other equipment or the like, during deployment and operation.

BACKGROUND OF THE INVENTION

The Storz fire fighting hose coupling, to recite Wikipedia, is a type of hose coupling invented by Carl August Guido Storz in 1882 composed of interlocking hooks and flanges. It is sometimes referred to as a sexless coupling because rather than having a male and female end connected by screw threads, either identical end can be joined to any other end of the same size. This is also called a two-way connection. Among other uses, it has been widely employed in firefighting applications. See FIG. 1. To couple a Storz connection, the two opposing couplings are pressed together such that the hooks, referred to as lugs LU herein, of each one are inserted into the slots SL in the flange or channel CH of the Storz rotatable collar COL of the other. Then the collars are rotated in opposite directions until they are tight, or the latches engage. This creates a water-tight connection. To uncouple, the latches are released and the couplings are turned in the opposite direction from coupling, and then separated when the hooks and slots are aligned. Fire engines typically carry large diameter hose with Storz couplings on both ends for connections between fire hydrants and pumps. (Hydrants in the USA may have threaded couplings that require an adapter to use with a Storz.) The benefit of Storz fittings is that the connection between the hose and the Storz is quick. Generally a hose can be locked together with a ¼ turn. By comparison, hoses with threaded couplings often take several turns. Because of this, benefit, Storz are widely viewed to be a safer alternative to threaded couplings. Guido Storz patented his coupling in Switzerland in 1890. See U.S. Pat. No. 0,489,107 to Carl August Guido Storz, granted in 1893.

Unfortunately Storz fire fighting hose couplings can be, and are, subject to damage during deployment and operation as a result of being dropped on the ground, scraped by other objects or drug over the ground, to mention major causes. Storz fittings are typically made of aluminum with an anodized coating to protect the fittings from corrosion and oxidation. Damage can occur to the coupling either in the form of deformation of the fitting, for instance as a result of being dropped when pulled from the hose bed located on top of a moving fire truck or trailer, or in the form of breach of the anodized coating as a result of abrasion, for instance as a result of sliding a considerable distance on the ground after the hose is initially placed under pressure. A breach of the anodized coating exposes the aluminum and subjects the fitting to oxidation and corrosion.

A serious result of the above recited damage is that the fitting fails under pressure, or is unable to be connected to another fitting or nozzle or fire hydrant or piece of firefighting equipment in the midst of an emergency.

The instant inventive apparatus for protecting a Storz coupling will, for convenience, be uniformly referred to herein as a "bumper." It should be understood that the "bumper" could be a collar attached to the outside of a Storz fitting, including either existing or specifically modified Storz fittings. The "bumper" could also comprise, however, and the term should be understood to also cover, any form of laterally extending or protruding protective material attached to or integrated into or manufactured into or onto, in some manner, Storz fittings, including prior Storz designs and novel Storz designs.

The term Storz fitting refers to a fitting having the traditional lug/slot/channel Storz coupling and functionality, described above. The fitting could incorporate two lugs or four lugs, etc. The fitting for firefighting purposes has a clamp end for coupling with a fire hose. FIG. 1 discussed above from the Wikipedia website illustrates a "basic" Storz fitting, and in particular the lug coupling end.

In general, a Storz firefighting fitting includes a hose clamping end and a rotatable collar end for coupling. The Storz fitting will provide a barrel for the flow of fluid therethrough, the barrel frequently constructed in two or more pieces.

The "bumper" of the instant invention is designed to protect the Storz fire fighting hose coupling from damage, as for instance from when a hose with this fitting is pulled from the bed of the top of a moving fire truck or trailer. The bumper is designed to be securely attached to the Storz in a variety of places using a variety of attachment designs, including molding into or onto Storz elements. A key aspect of the bumper is an adequate lateral extension of protective material and a means to maintain its position on the Storz during use.

When Storz fittings hit the ground while laying hose, they fall on hard surfaces, rocks or worse. A hose is typically pulled from a hose bed at 6 to 8 mph and then pressured up. The hose thus can be caused to slide a considerable distance on the ground. The bumpers of the instant invention have been designed and tested to protect a basic Storz hose fitting from damage, bending, being deformed, and/or from having its anodized coating or paint scraped off by such acts. Any of such events over time can ruin a fitting, with the result that the fitting could fail under pressure or be unable to be connected to another fitting or a nozzle in an emergency. Testing has confirmed the utility of the instant invention.

It is envisioned that embodiments of the instant invention may be retrofitted onto existing Storz fittings or fit onto Storz fittings particularly structured to accommodate this purpose. Thus, the bumper may be attached to or incorporated into or with existing or modified Storz fittings. Of primary interest are 5-inch and 6-inch to 12 inch Storz fittings commonly used in fighting industrial storage tank fires, such as those manufactured and/or sold by Redhead Brass or Harrington, Inc. in compliance with NFPA standards.

The bumper of the instant protected Storz fire fighting hose coupling or fitting should preferably provide at least a ¼ inch clearance above the ground for the anodized surfaces of the fitting, or at least for the rotatable collar surfaces, and most preferably should provide a ½ inch lateral clearance. The bumper, in embodiments, includes a collar constructed substantially of rubber or rubber molded onto steel, and may be formed in pieces. The bumper is fitted around the circumference of a Storz fire fighting hose coupling between the hose end and the coupling end, such as by bolting the pieces together. The bumper may be further held in place by a steel band. The interior surface of the bumper may be structured to mate with the exterior surface of the fitting to help secure the fit.

In preferred embodiments, when two Storz fittings having the instant invention are connected, the position of the bumpers relative to each other, and as positioned along the overall length of the two-fitting assembly, is such that when laid upon the ground, the overall assembly rests upon the two bumpers preferably with all of the anodized surfaces being elevated, and preferably at least ½ inch above the ground. As the hoses and fittings are placed under pressure, only the two bumpers of the connected fittings preferably slide directly over and in contact with the ground.

SUMMARY OF THE INVENTION

The instant invention includes method and apparatus for protecting the form and surface of a Storz fire fighting hose coupling from damage due to collision or abrasion.

In one preferred embodiment, a bumper is formed of an inner ring and an outer ring, segmented for attachment, and held together by bolts. The inner ring of this preferred bumper may be comprised substantially of a material such as steel or the like, with sufficient strength to protect the form of the coupling from damage due to being dropped, such as from the hose bed of a fire truck or trailer. The outer ring is preferably substantially comprised of rubber or the like. Santoprene thermoplastic rubber has proved satisfactory.

In some embodiments the bumper is formed entirely of rubber, in one piece or multiple pieces, and is attached to the Storz fitting in the middle of the fitting or on the coupling end or hose clamp end of the fitting. Lug and detent or other such mating surface variations may be provided between the rubber bumper and the Storz fitting in order to help secure the rubber bumper in place during use.

Bumpers can be designed to operate with existing Storz fire fighting fittings or portions of a fitting may be restructured to more easily accommodate a bumper. In one preferred embodiment the hose clamp may be redesigned with a rib to facilitate attaching a bumper. Alternately, a bumper may be molded directly onto a Storz fitting element, such as a hose clamp or a rotatable collar portion.

The laterally extending or protruding material, referred to as the bumper, can be constructed integrally with a Storz. The outside profile of the laterally protruding or extending material would nominally be circular but it could be irregularly shaped, waved, peaked, asymmetrical. The outside profile could comprise a plurality of projections. The laterally extending or protruding material could be built up on a nominal, traditional Storz coupling structure.

The essential feature of the laterally extending protective material is that it is firmly seated and extends laterally with a sufficient profile in order to hold at least the rotatable coupling collar off of the ground by at least ¼ of an inch.

In preferred embodiments, the invention includes a protected Storz fire fighting coupling comprising a fitting having a hose end structured for a sealed connection to a fire hose, a rotatable Storz-type coupling end structured for a sealed connection to a second Storz-type coupling, and a bumper attached to the fitting having an effective outside diameter of at least one-half inch greater than the effective outside diameter of the coupling collar, and preferably one inch greater.

In a first embodiment of the invention, the bumper included a ring circumferentially attached to an exterior portion of the fitting between the hose end and the coupling end. The inner ring is circumferentially attached to an exterior portion of the fitting between the hose end and the coupling end and the outer ring matingly affixed to the inner ring. The inner ring is preferably comprised of steel or the like and the outer ring is preferably comprised of rubber or the like. Such bumper may be comprised of two semi-circular halves which are structured to fit around the fitting and be secured to each other with bolt connections or the like. In a second embodiment an all rubber bumper is attached to an over a hose clamp, and includes a removable steel band for attachment and mating lugs and detents between the bumper and hose clamp.

The instant invention also includes a method for protecting a Storz fire fighting fittings comprising attaching a bumper to a Storz fitting, the fitting having a hose end structured for a sealed connection to a hose and a coupling end structured for a sealing connection to a second Storz-type coupling. The bumper is attached having an effective outside diameter at least one half inch greater than an outside diameter of at least the rotatable collar. The method may include structuring the bumper as two or more portions structured to interconnect around the fitting, and may include connecting the two halves by bolt connections or the like. A steel band may be used to secure a fit. In some embodiments, the method may include modifying a Storz hose-type fitting to provide an area of the fitting particularly suitable for affixing a bumper.

BRIEF DESCRIPTION OF THE DRAWINGS

A better understanding of the present invention can be obtained when the following detailed description of the preferred embodiments are considered in conjunction with the following drawings, in which:

FIG. 5 is a cross-section illustration of two preferred embodiments of the above protected Storz hose-type fire fighting fitting, connected to each other by way of the respective Storz-type coupling ends.

FIGS. 15 through 18 illustrate a modified hose clamp and bumpers designed to mate with and fit over the modified hose clamp.

FIG. 19 illustrates a bumper moldable upon a portion of a Storz fitting such as a hose clamp or a rotatable collar.

The drawings are primarily illustrative. It would be understood that structure may have been simplified and details omitted in order to convey certain aspects of the invention. Scale may be sacrificed to clarity.

DETAILED DESCRIPTION OF THE PREFERRED EMBODIMENTS

As used herein bumpers and rotatable collars are spoken of as having "an effective" outside diameter. The phrase "effective outside diameter" is used to avoid confusing the issue by odd spikes or projections on the outside diameter of a Storz fitting which have no effective purpose. The effective outside diameter is the practical outside diameter, the diameter of the unit upon average as it is dropped or laid upon the ground. Extending laterally reflects indicates extending in the radial direction, outward from the axis of the fitting.

Figure 1:
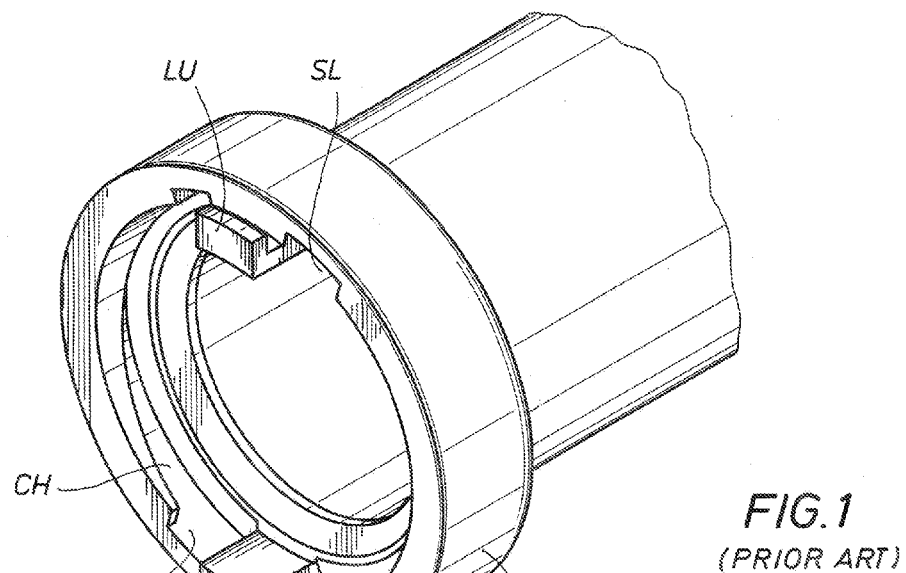
FIG. 1 is an illustration of a Storz connector from the Wikipedia website, illustrating a basic Storz collar with hooks or lugs, slots and channel.

As above discussed, FIG. 1 illustrates a basic Storz connector from the Wikipedia website. The illustration shows the basic lug or hook LU, slot SL, channel CH and rotatable collar COL characteristic of the Storz connector.

Figure 2A:
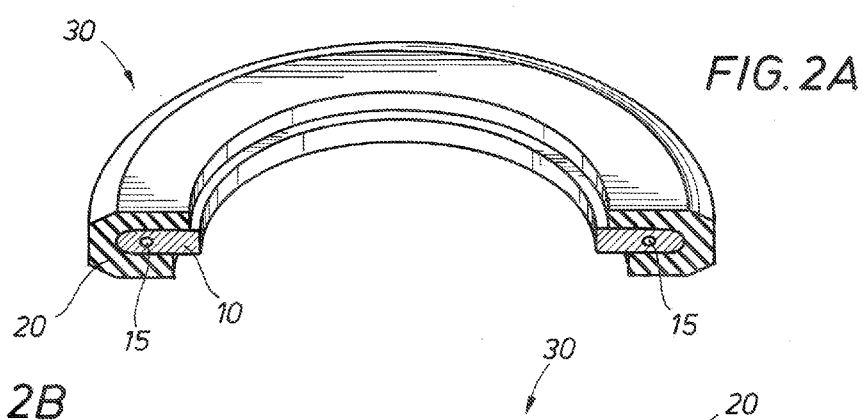
FIG. 2A is a perspective illustration of one semi-circular half of a preferred embodiment of a bumper.
Figure 2B:
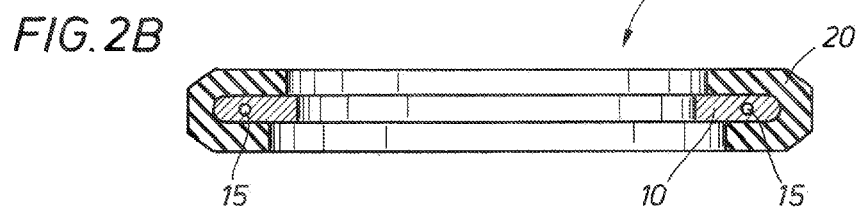
FIG. 2B is a side illustration of the embodiment of the bumper.
Figure 3:
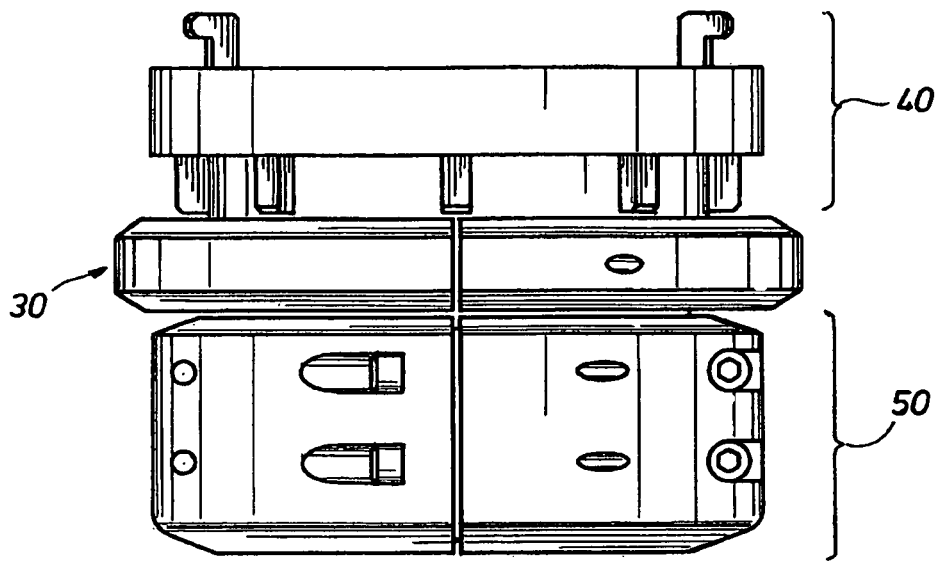
FIG. 3 is a side illustration of a protected Storz hose-type fire fighting fitting having a bumper as in FIGS. 2A and 2B.
Figure 4:
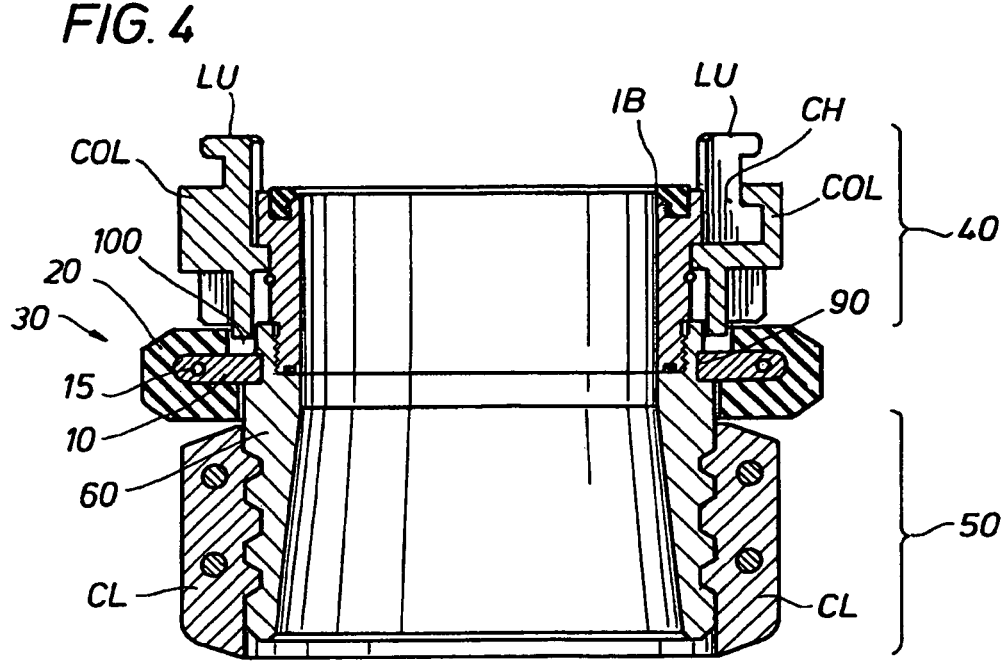
FIG. 4 is a cross-section illustration of the embodiment of FIG. 3.

FIGS. 2A and 2B illustrate one half of a two-piece embodiment of laterally extending protective material, or bumper 30, designed to attach to a Storz fitting. Illustrated is an embodiment designed to attach mid fitting, between the clamp end 50 and collar end 40 of a Storz fitting, illustrated in FIG. 3. The bumper includes an inner ring 10, preferably made substantially of steel or the like. An outer ring 20 preferably molded thereto, and most preferably integrally molded, is preferably made substantially of rubber or the like. Holes 15 are provided to secure the two halves to each other by bolt attachment, or the like. FIGS. 3 and 4 further illustrate this preferred embodiment of a protected Storz fire fighting fitting. The bumper 30 sits on the outside circumference of an inner barrel or sleeve 60 of the fitting between a hose end 50 and a Storz rotatable coupling end 40. The bumper may be a collar formed of two semi-circular halves, each comprised of an outer-ring substantially of rubber and an inner-ring substantially of steel, the two semi-circular halves connected around the exterior of the fitting, with an inner-ring of the bumper preferably inserted in a circumferential channel 90 on the outside circumference of an inner sleeve of the fitting, and held in place in part by two bolts through bolt holes 15. The depth of the channel and exposed surface of the bumper's inner ring may be such that the bumper's outer-ring rests flush against the surface of the outside circumference of the fitting's inner sleeve. The outer-ring, as illustrated in FIG. 4, may include a groove 100 on the side abutting the rotatable coupling end, to accommodate a shoulder of the coupling end while permitting a portion of the coupling end to rotate. In other embodiments the outer-ring may include additional grooves or differently shaped grooves to accommodate the features and designs of other fittings. Further embodiments include a method of modifying an existing fitting to more easily accommodate a bumper, as for instance by adding a channel 100 to accommodate a bumper inner ring, or by extending the space between a coupling end 40 and a hose end 50 to provide an appropriate area intermediate the fitting ends on which to affix a bumper.

FIG. 5 illustrates two fittings that are embodiments of the instant invention, connected to each by way of their respective coupling ends 40. FIGS. 3, 4 and 5 further illustrate together typical components of a Storz fitting. An inner barrel IB is provided, typically in two pieces as illustrated in FIG. 4. A clamp CL for attaching hose to the fitting is provided by structure, clamp CL containing characteristic teeth on an inner surface mating with symmetrical teeth on the outside of a portion of the inner barrel. The hose end is effectively pressure and water tight sealed against the Storz fitting by being clamped between clamp CL and inner barrel IB. The clamp usually includes fastening and tightening bolts and screws, as illustrated in FIG. 3. FIG. 5 illustrates the mating of two Storz fittings with each other in accordance with traditional design parameters.

Figures 6A, 6B:
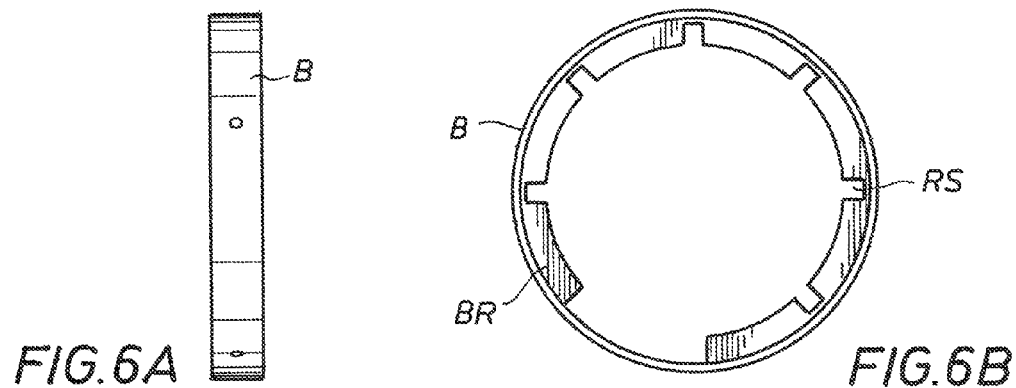
FIG. 6 illustrates a one piece embodiment of a bumper designed to slip onto a rotatable collar on a coupling end of a Storz fitting, the mating fitting portion being illustrated in FIG. 7 and FIG. 8 for clarity.
Figure 8A:
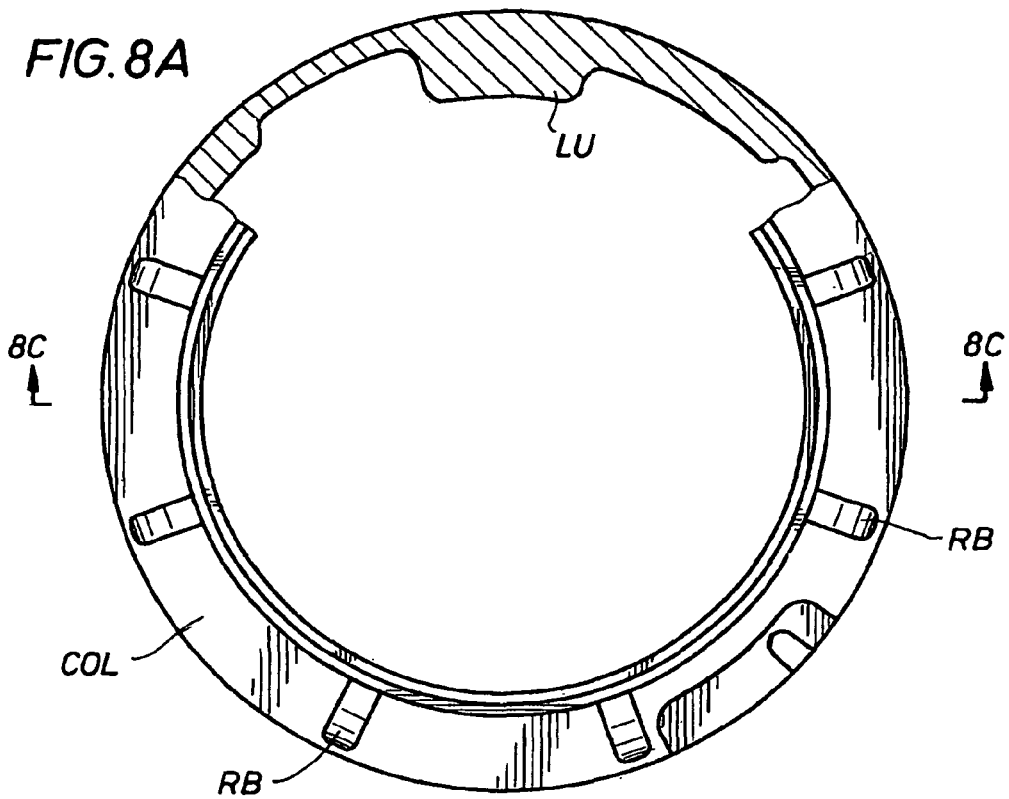
Figure 8B:
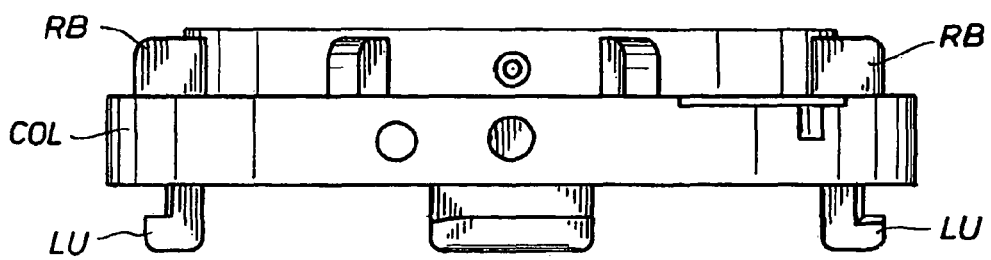
Figure 8C:
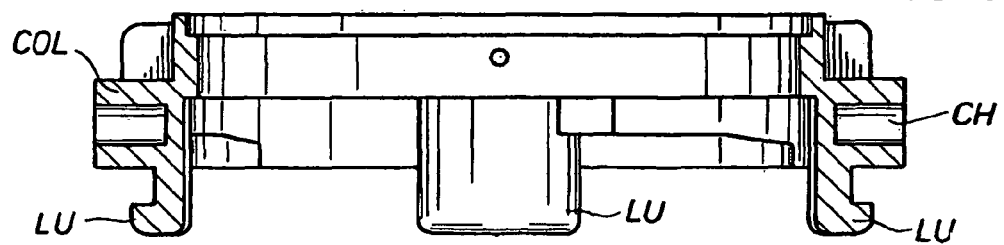
Figure 9A:
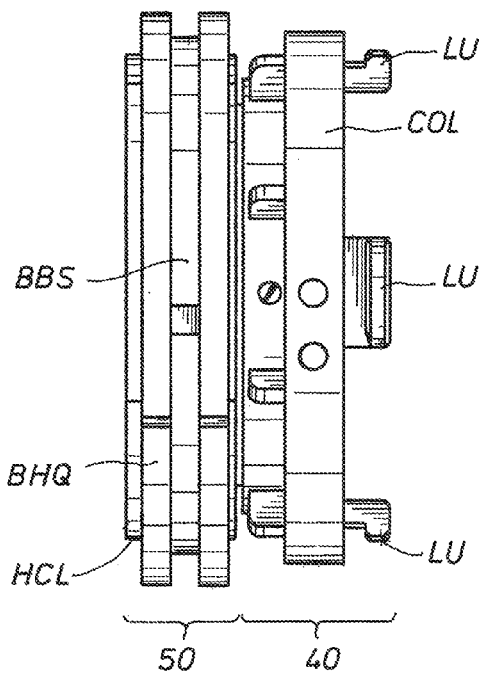
Figure 9C:
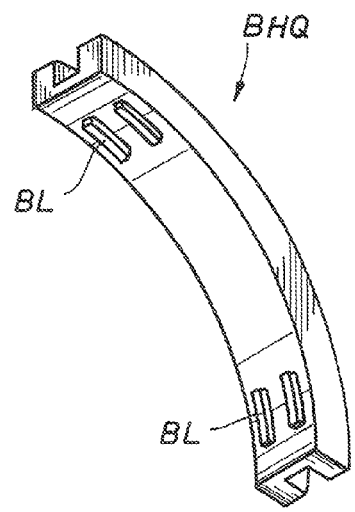
Figure 9B:
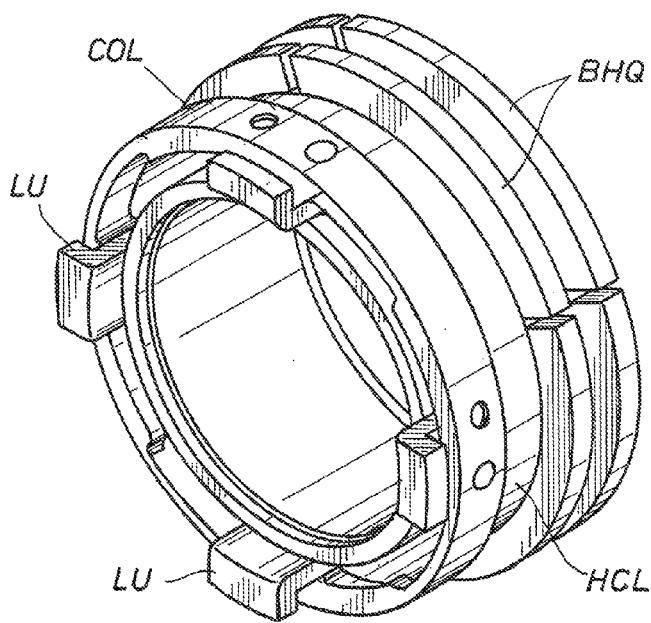
Figure 10A:
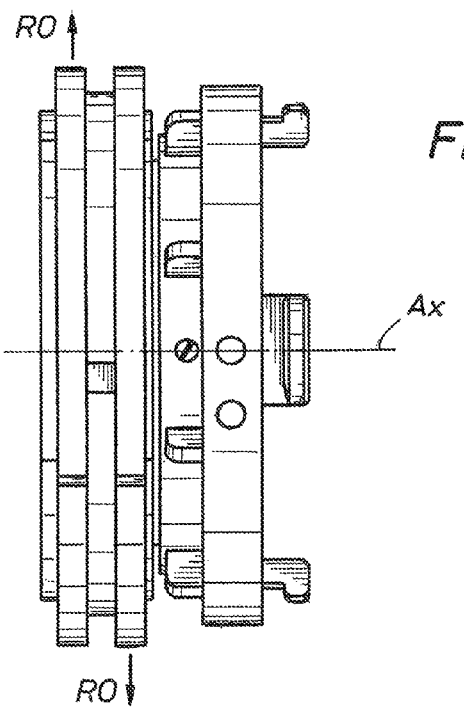
Figure 10C:
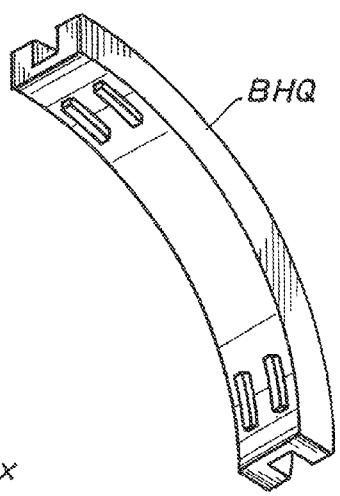
Figure 10B:
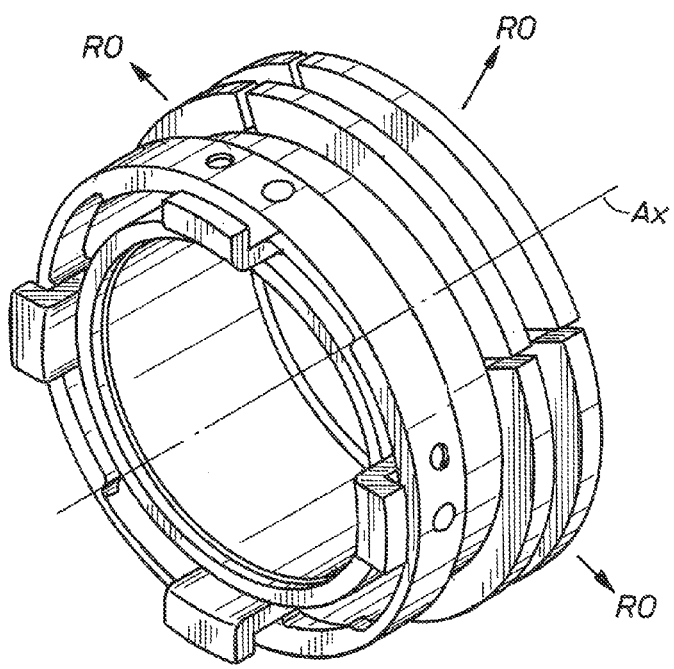
Figure 10D:
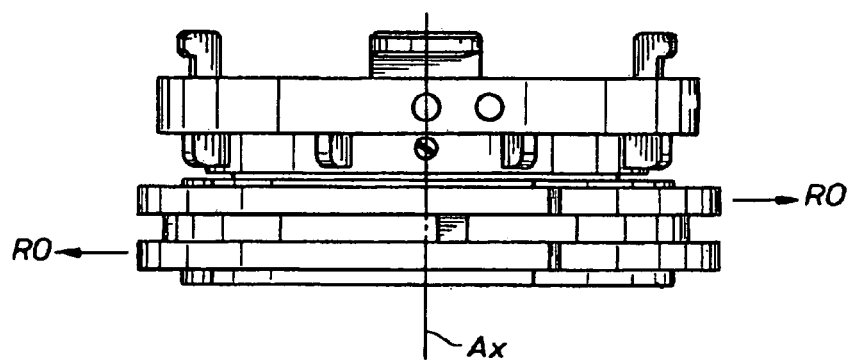
Figures 10E, 10F:
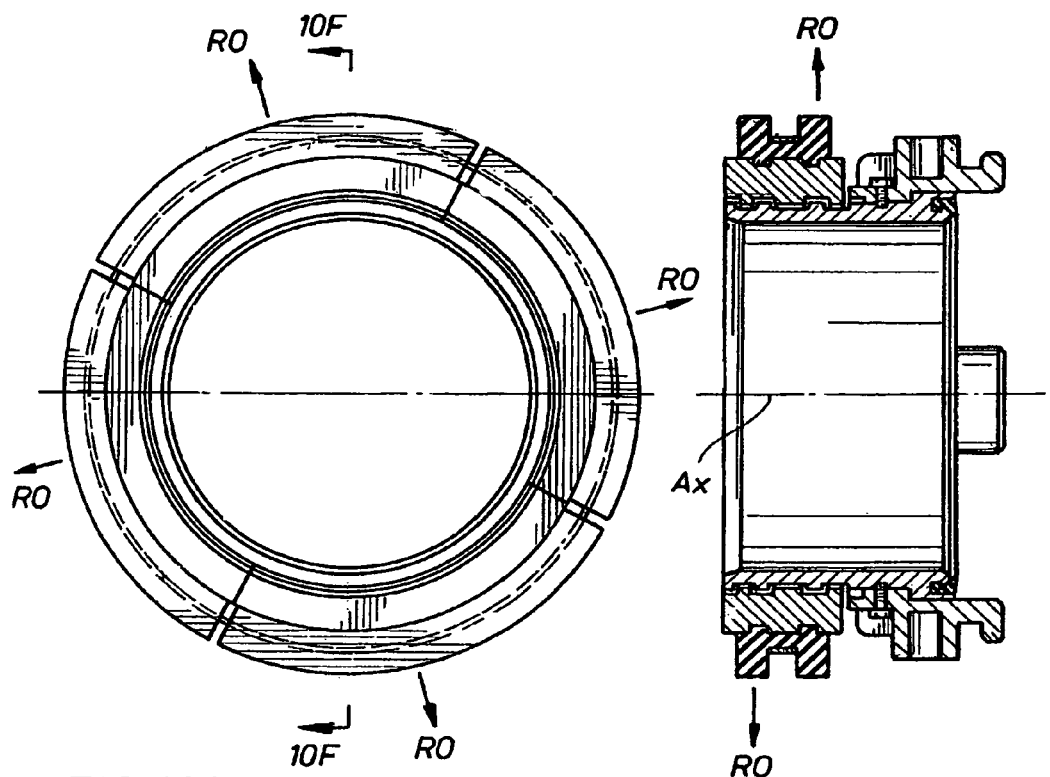

FIGS. 6, 7 and 8 illustrate an alternate bumper design for attaching to a Storz fitting upon a portion of the rotating collar end. FIG. 6A illustrates a side view and FIG. 6B illustrates a top view of this bumper B. The bumper of the embodiment of FIG. 6 is envisioned to be comprised of appropriate rubber and can be formed as a ring in one piece. The bumper forms a collar having bumper ribs BR and rib slots RS such that the bumper can slip over a portion of a rotating collar COL (see FIGS. 7 and 8) of a Storz fitting. The bumper of FIG. 6 is designed to slide over a portion of rotating collar COL such that collar ribs RB fit into the bumper rib slots RS and bumper ribs BR fit in between the collar ribs RB. In this embodiment the bumper rotates with the collar. It can be seen from FIG. 6B that one bumper rib is absent in order to avoid covering up the latch LTC typically found on the rotating collar COL of a Storz fitting.

FIGS. 9-14 illustrate alternate bumper embodiments primarily designed to attach to the hose clamp of a Storz fitting. As illustrated in FIG. 9A-9F and 10C, the bumper BHQ is envisioned to be comprised of segmented pieces that, when attached together, form a collar to fit to and over the hose clamp HCL of a Storz fitting. In a preferred embodiment, illustrated in FIG. 9, the bumper is comprised of rubber, preferably Santoprene thermoplastic rubber. The bumper design exhibits a channel CH between two rib portions. The channel is utilized for affixing the bumper to the hose clamp with a stainless steel screwlocked buckle system and a stainless steel band. The stainless steel band fits within the channel of the bumper. The screwlocked buckle system permits the bumper to be securely attached and removed. FIG. 9E illustrates a bumper BHQ comprised of four quarters or segments, united. The location for the bumper band of steel is indicated as BBS. In this embodiment the bumper does not rotate with collar COL but remains fixed with hose clamp HCL.

FIG. 10 are similar to FIG. 9. FIG. 10 however are marked to particularly illustrate the axis AX of a Storz fitting and the radially outward direction RO for lateral extension from that axis. As is illustrated the radially outward extension direction need not always lie in the same plane, but it has a radially outward component from the Storz fitting axis.

FIGS. 9-12 also illustrate lugs on an interior surface of a bumper molded to mate with existing or formed detents on the exterior surface of a hose clamp. By mating lugs and detents, the relative position between the bumper and the hose clamp can be better maintained in practice against torque or sliding motion. In this regard any configuration of mating surfaces between the bumper and a hose clamp could serve to inhibit sliding motion. Even roughed surfaces of the hose clamp and bumper would serve such purpose. However, existing hose clamps tend to already have detents to provide for their screws or bolts, so one simple solution is to mold lugs to engage those existing clamp holes in newly formed bumpers.

Figures 11A, 11B, 11C:
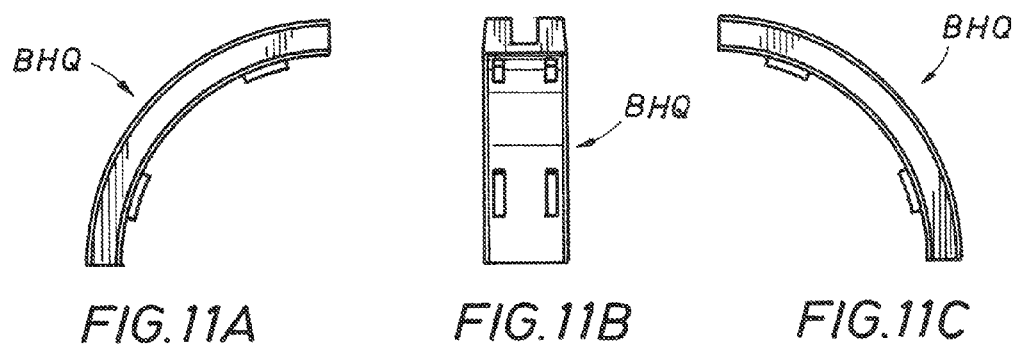
FIGS. 9 through 12 illustrate another preferred embodiment of a bumper for a protected Storz fitting, this bumper attaching onto and over the hose clamp of a Storz fitting.
Figures 12A, 12B:
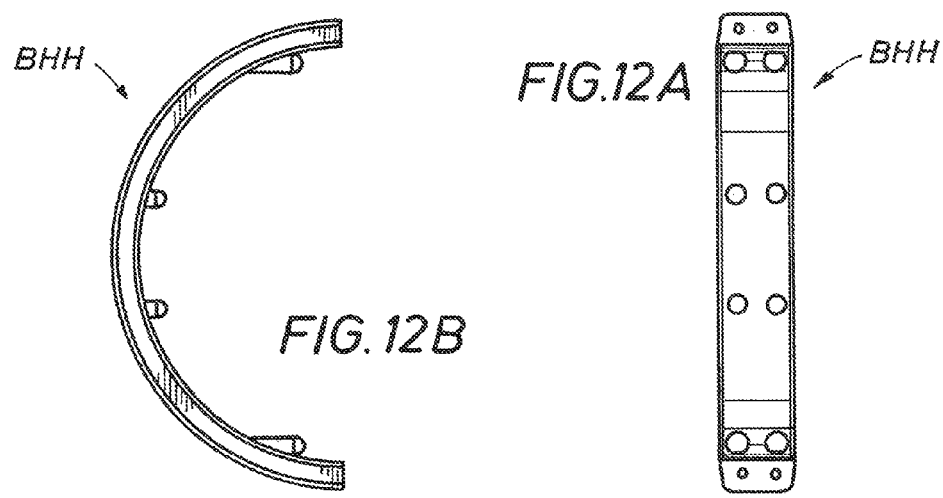
Figure 7A:
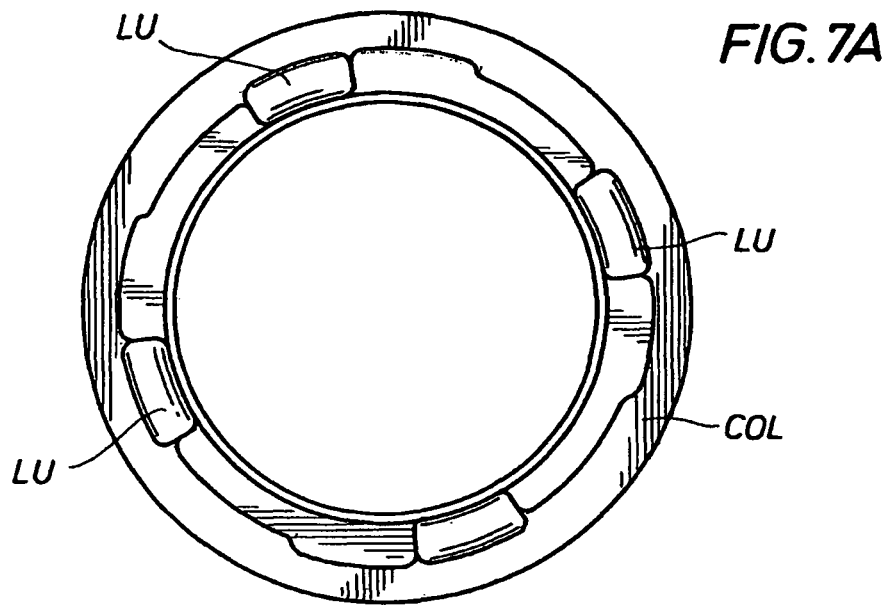
Figure 7B:
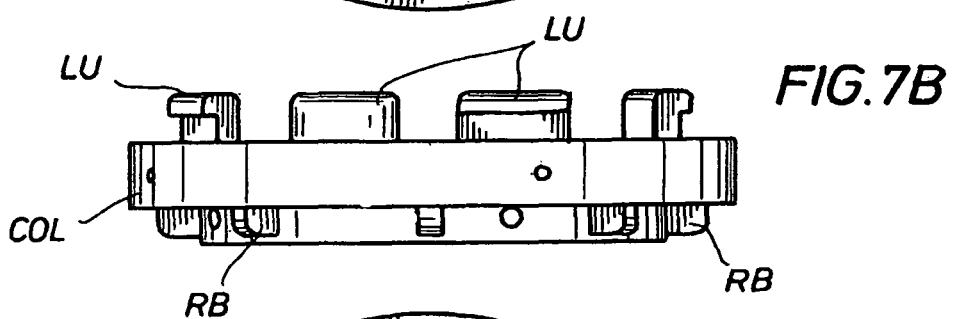
Figure 7C:
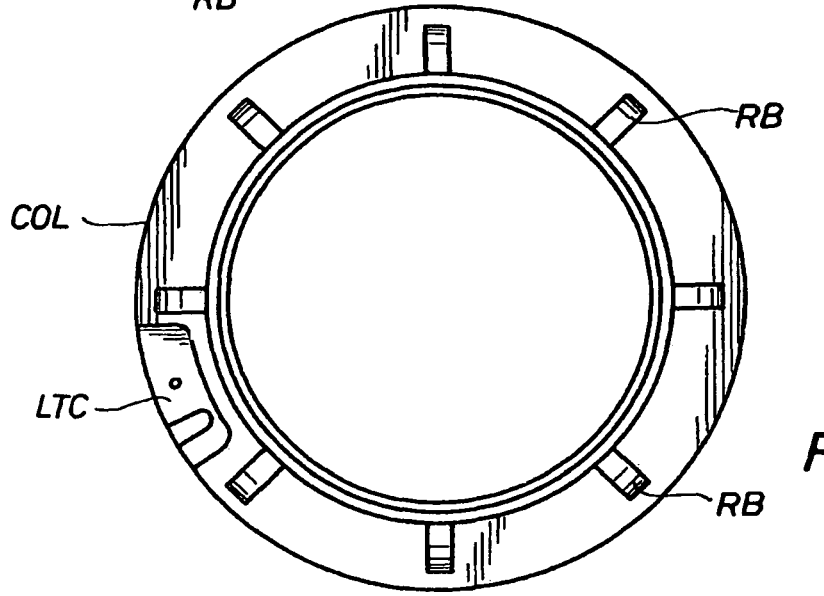
Figure 7D:
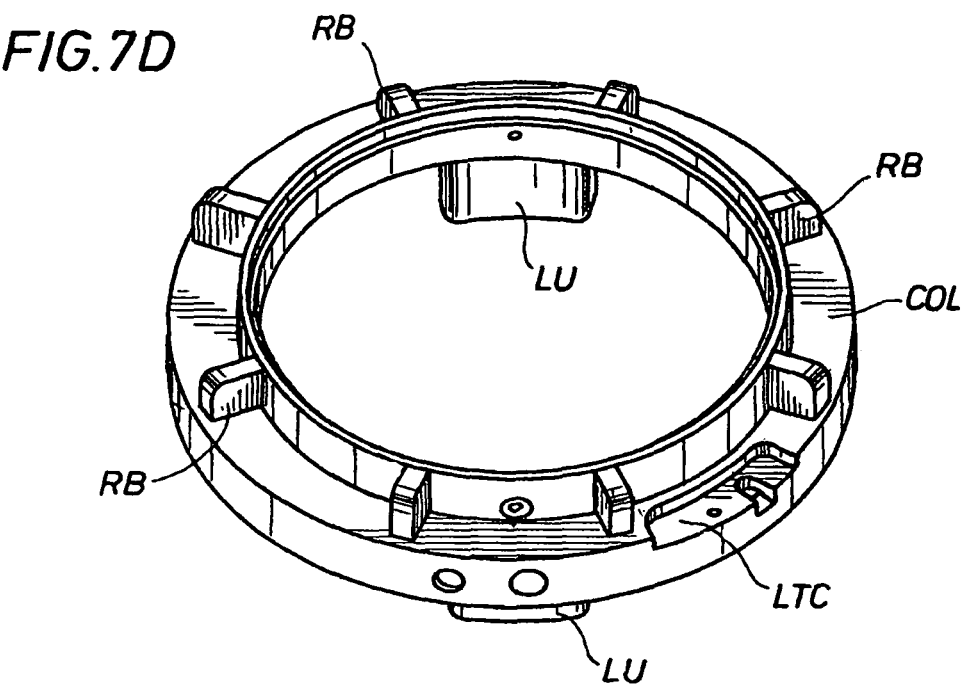
Figure 7E:
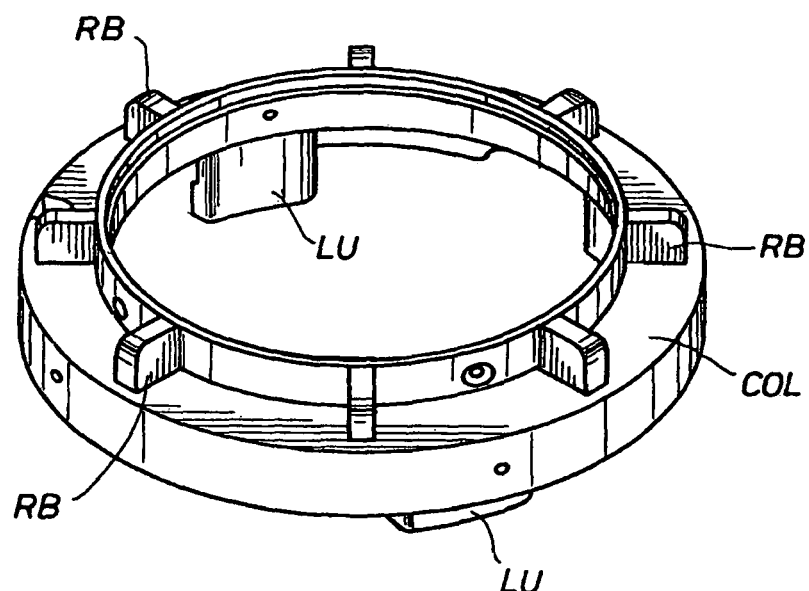
Figure 13B:
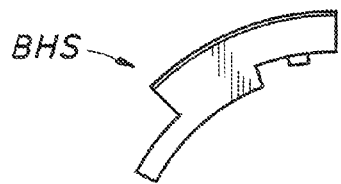
FIGS. 13 and 14 illustrate alternate designs for bumpers that fit over a hose clamp on a Storz fitting.
Figure 13A:
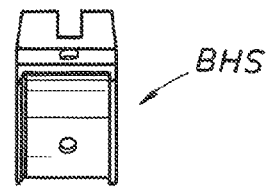
Figure 14A:
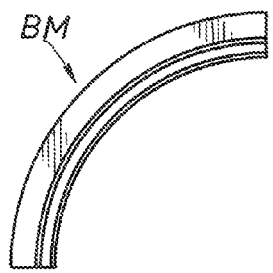
Figure 14B:
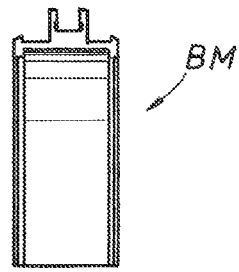

FIG. 11 illustrates a bumper BHQ analogous to the bumper of FIGS. 9 and 10, showing the bumper in quarter sections. FIG. 12 illustrates a bumper BHH comprised of two semi-circular pieces and wherein the lugs include a plurality of downwardly extending cylindrical bosses. FIG. 13 illustrates a bumper BHS segmented into multiple pieces where the pieces fit together analogous to tongue and groove construction to provide more secure positioning. FIG. 14, illustrates BM a bumper wherein the ribs to the left and the right to the channel for the steel band are less pronounced.

Figure 16A:
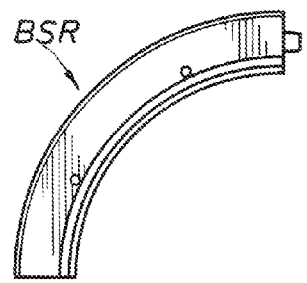
Figure 16B:
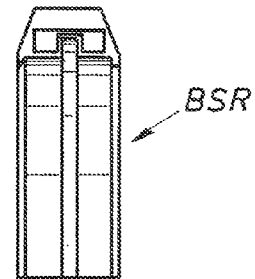
Figure 16C:
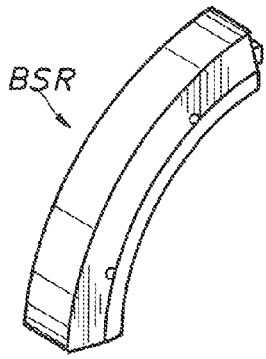

FIGS. 15, 16, 17 and 18 illustrate a bumper designed to conform to a novel hose clamp. FIG. 15A-15D illustrate a novel hose clamp HCLN designed to contain a rib RB extending outward from the middle of the hose clamp. The hose clamp HCLN continues to have clamp holes CLD which provide detents for mating lugs in a mating bumper. FIG. 15C presents an end view of hose clamp HCLN with protruding rib RB. FIGS. 16, 17 and 18 illustrate a bumpers, BSR and BMR, segmented or molded, and designed with an interior channel to fit over the rib RB of the hose clamp HCLN of FIG. 15. In addition, the segments of FIG. 16A-16C contain slot and groove end portions in order to fit more securely together upon attachment. Bumper BSR could be attached to the rib RB of the novel hose clamp HCLN by means of screws screwing into the rib RB at the screw holes SH of the hose clamp HCLN.

FIG. 19 illustrates a further embodiment of a bumper BMCL designed to be molded onto the top of a hose clamp HCL or rotatable collar (not shown in this figure.) FIG. 18 illustrates that the bumper BMR could be molded and formed in one piece with a hose clamp or collar, if desired.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A protected 5-inch to 12-inch fitting for forming a joint for coupling fire fighting hose, the fitting having a coupling end and a hose connecting end, the fitting comprising:
    a hose clamp on the hose connecting end;
    a two-way Storz coupler with a rotating coupling collar on the coupling end, the rotating coupling collar providing an exterior surface structured to remain exposed upon coupling with another said Storz coupler;
    an inner barrel providing an inner barrel portion between the hose clamp and the two-way Storz coupler; and
    a bumper including protective material, the bumper:
        attached to the inner barrel portion,
        structured so as not to fully enclose the coupling end,
        having an effective outside diameter at least ¼-inch greater than the effective outside diameter of the rotating coupling collar, and
        including an inner ring and an outer ring of elastic material, the inner ring circumferentially attached to and mating with a shoulder of the inner barrel portion.

2. The protected fitting of claim 1 wherein the inner barrel portion, has an effective outside diameter less than the effective outside diameters of the rotating coupling collar and the hose clamp.

3. The protected fitting of claim 1 or 2 wherein the inner ring comprises steel and wherein the outer ring comprises rubber affixed to and substantially enclosing the inner ring from at least three sides.

4. The protected fitting of claim 3 wherein the bumper is comprised of a plurality of portions structured to fixedly interconnect.

5. The protected fitting of claim 3 wherein the outer ring is molded to the inner ring.

6. The protected fitting of claim 3 wherein a bumper channel is formed in the inner barrel portion and the inner ring is inserted in the bumper channel.

7. A protected 5-inch to 12-inch fitting for forming a joint for coupling fire fighting hose, the fitting having a coupling end, the fitting comprising:
    a two-way Storz coupler with a rotating coupling collar on the coupling end, the rotating coupling collar having exterior ribs structured to remain exposed upon coupling with another said Storz coupler; and
    a bumper including protective material, the bumper
        attached to the rotating coupling collar,
        having rib slot portions fitting between the rotating coupling collar exterior ribs,
        structured so as not to fully enclose the exterior ribs, and,
        having an effective outside diameter at least ¼-inch greater than the effective outside diameter of the rotating coupling collar.

8. A protected 5-inch to 12-inch fitting for forming a joint for coupling fire fighting hose, the fitting having a coupling end and hose connecting ends, the fitting comprising:
    a hose clamp on the hose connecting end;
    a two-way Storz coupler with a rotating coupling collar on the coupling end, the rotating coupling collar providing an exterior surface structured to remain exposed upon coupling with another said Storz coupler; and
    a bumper including protective material, the bumper
        attached to the hose clamp,
        having inner surface protrusions that mate with exterior surface cavities of the hose clamp to resist sliding motion therebetween,
        structured so as not to fully enclose the coupling end, and
        having an effective outside diameter at least ¼-inch greater than the effective outside diameter of the rotating coupling collar.

9. The fitting of claim 8 wherein the hose clamp cavities include detents in the clamp outer surface and the interior surface protrusions of the bumper include lugs structured to mate with the detents in the outer surface of the hose clamp.

10. The fitting of claim 8 including a steel band fitting within a channel of the bumper to assist to affix the bumper to the hose clamp.

11. The fitting of claim 8 wherein the hose clamp contains a rib in its outer surface and the bumper contains a slot in its inner surface designed to mate over the rib.

12. The fitting of claim 8 wherein the bumper is molded onto a hose clamp containing an exterior circumferential rib.

13. The fitting of claim 1, 7 or 8 wherein the bumper has an effective outside diameter of at least ¼ inch greater than the effective outside diameter of the rotating coupling collar.

* * * * *